(12) United States Patent
Leonov (10) Patent No.: US 8,975,791 B2
(45) Date of Patent: Mar. 10, 2015

(54) PATTERNED ELECTRET STRUCTURES AND METHODS FOR MANUFACTURING PATTERNED ELECTRET STRUCTURES

(75) Inventor: Vladimir Leonov, Leuven (BE)

(73) Assignee: IMEC, Leuven (BE)

(*) Notice: Subject to any disclaimer, the term of this patent is extended or adjusted under 35 U.S.C. 154(b) by 681 days.

(21) Appl. No.: 13/059,266

(22) PCT Filed: Sep. 11, 2009

(86) PCT No.: PCT/EP2009/061825
§ 371 (c)(1),
(2), (4) Date: Feb. 16, 2011

(87) PCT Pub. No.: WO2010/029161
PCT Pub. Date: Mar. 18, 2010

(65) Prior Publication Data
US 2011/0163615 A1    Jul. 7, 2011

Related U.S. Application Data (60) Provisional application No. 61/096,598, filed on Sep. 12, 2008.

(51) Int. Cl.
| | | |
|---|---|---|
| G11C 13/02 | (2006.01) | |
| H01G 7/02 | (2006.01) | |
| H04R 19/01 | (2006.01) | |

(52) U.S. Cl.
CPC ............... *H01G 7/02* (2013.01); *H04R 19/016* (2013.01)
USPC ........................................................ 307/400

(58) Field of Classification Search
CPC combination set(s) only.
See application file for complete search history.

(56) References Cited

U.S. PATENT DOCUMENTS

| | | | | |
|---|---|---|---|---|
| 5,512,773 | A | * | 4/1996 | Wolf et al. ............. 257/471 |
| 6,870,939 | B2 | * | 3/2005 | Chiang et al. .......... 381/175 |

(Continued)

FOREIGN PATENT DOCUMENTS

| | | |
|---|---|---|
| JP | 50-67998 | 6/1975 |
| JP | 06 214440 | 8/1994 |

(Continued)

OTHER PUBLICATIONS

Leonov, V. et al., "Stabilization of Positive Charge in SiO2/Si3N4 Electrets", IEEE Transactions on Dielectrics and Electrical Insulation, vol. 13, No. 5, Oct. 2006, pp. 1049-1056.

(Continued)

*Primary Examiner* — Jared Fureman
*Assistant Examiner* — Aqeel Bukhari
(74) *Attorney, Agent, or Firm* — McDonnell Boehnen Hulbert & Berghoff LLP (57) ABSTRACT

A patterned electret structure (21) on a substrate (10) comprises a dielectric structure comprising at least one non-patterned dielectric layer (22), and a charge pattern (14) in the dielectric structure and/or at a surface of a dielectric layer that is part of the dielectric structure and/or at an interface between dielectric layers that are part of the dielectric structure. By the presence of the non-patterned dielectric layer (22), the influence of the presence of a conductive substrate (10) on the charges (14) of the electret structure (21) is alleviated, hence increasing the charge stability over time. Moreover, in embodiments of the present invention, the charge stability is substantially independent of the width (W1, W2, W3) of the charge pattern. A method for manufacturing such patterned electret structure (21) is also provided.

14 Claims, 10 Drawing Sheets

(56) References Cited

U.S. PATENT DOCUMENTS

2006/0214535 A1* 9/2006 Salmon .................. 310/309
2008/0100148 A1 5/2008 Murayama et al.

FOREIGN PATENT DOCUMENTS

JP 2008112781 5/2008
WO WO2006/102444 9/2006

OTHER PUBLICATIONS

Genda, Takashi et al., "High Power Electrostatic Motor With Micropatterned Electret on Shrouded Turbine", Proceedings of the 13th International Conference on Solid-State Sensors, Actuators and Microsystems, Jun. 5-9, 2005, Seoul, Korea, pp. 709-712.

International Preliminary Report on Patentability, PCT International Application PCT/EP2009/061825 dated Dec. 23, 2010.

International Search Report and Written Opinion, PCT International Application No. PCT/EP2009/061825 dated Feb. 10, 2010.

Jacobs, Heiko O. et al., "Submicrometer Patterning of Charge in Thin-Film Electrets", Science, vol. 291, Mar. 2, 2001, pp. 1763-1766.

Database WPI Jun. 6, 1975 Thomson Scientific, London, GB; "Patterned Electret Films—Prepd. by Pattern-Wise Polarisation of Plastice Films", AN 1976-02632X [2]; XP002558213, & JP 50 067998 A (Matsushita Elec. Ind. Co. Ltd.) Jun. 6, 1975.

Leonov, V. et al., "Patterning of SiO2/Si3N4 Electret", 13th International Symposium on Electrets, ISE 13, Sep. 15, 2008, Sep. 17, 2008, XP002558180.

* cited by examiner

FIG. 14

PATTERNED ELECTRET STRUCTURES AND METHODS FOR MANUFACTURING PATTERNED ELECTRET STRUCTURES

CROSS REFERENCE TO RELATED APPLICATIONS

The present application is a national stage entry of PCT/EP2009/061825, filed Sep. 11, 2009, and claims priority to U.S. Provisional Application 61/096,598, filed Sep. 12, 2008, the entire contents of which is incorporated herein by reference.

FIELD OF THE INVENTION

This invention relates to patterned electret layers or structures and to methods for forming patterned electret layers and structures wherein the patterned electret layers have good charge stability and wherein the charge stability is substantially independent of the line width of the patterned electret structures. The invention further relates to methods for manufacturing patterned electret structures and for fabricating microstructures from such electret structures (e.g. for use in devices such as transducers, micro-motors, micro-bearings and miniaturized power generators such as energy scavengers).

BACKGROUND OF THE INVENTION

An electret or electret structure is a structure comprising a dielectric material and a quasi-permanent electrical charge, so that the electret structure exhibits either a quasi-permanent electrical charge or dipole polarization. An electret may contain positive or negative charges in charge traps on the dielectric's surface (a surface charge) or in the dielectric's volume (a space charge) or it may contain oriented (aligned) dipoles. An electret can, for example, be formed by polarization in the presence of a high electric field, by cooling a suitable dielectric material within a strong electric field after having it heated above its melting temperature, or by the application of corona or electron beam injection. The theory and applications of electrets have been studied in the past decades.

When an electret is exposed to e.g. a pressure wave, a thermal wave, a mechanical distortion or a light wave, a signal can be produced in an external circuit. Therefore, electrets can be used to sense pressure, temperature, light or sound. Electrets are used in a number of applications such as air filters, radiation dosimeters, transducers such as relays and microphones, and sensors.

Both organic and inorganic materials may be used for forming electrets. Silicon dioxide and silicon nitride based materials are interesting inorganic electret materials for MEMS applications because of their compatibility with MEMS technology.

A patterned electret structure is an electret structure with a charge pattern, i.e. an alternation or succession of regions with charges and regions without charges. In prior art, patterned electret structures are formed by patterning one or more dielectric layers and (fully) charging these one or more dielectric layers. In micromachined devices, there is often a need for regions with charges that are alternating with regions without charges. The regions with charges are created by providing an electret. In between the regions with charges, only substrate is present.

Figure 1:
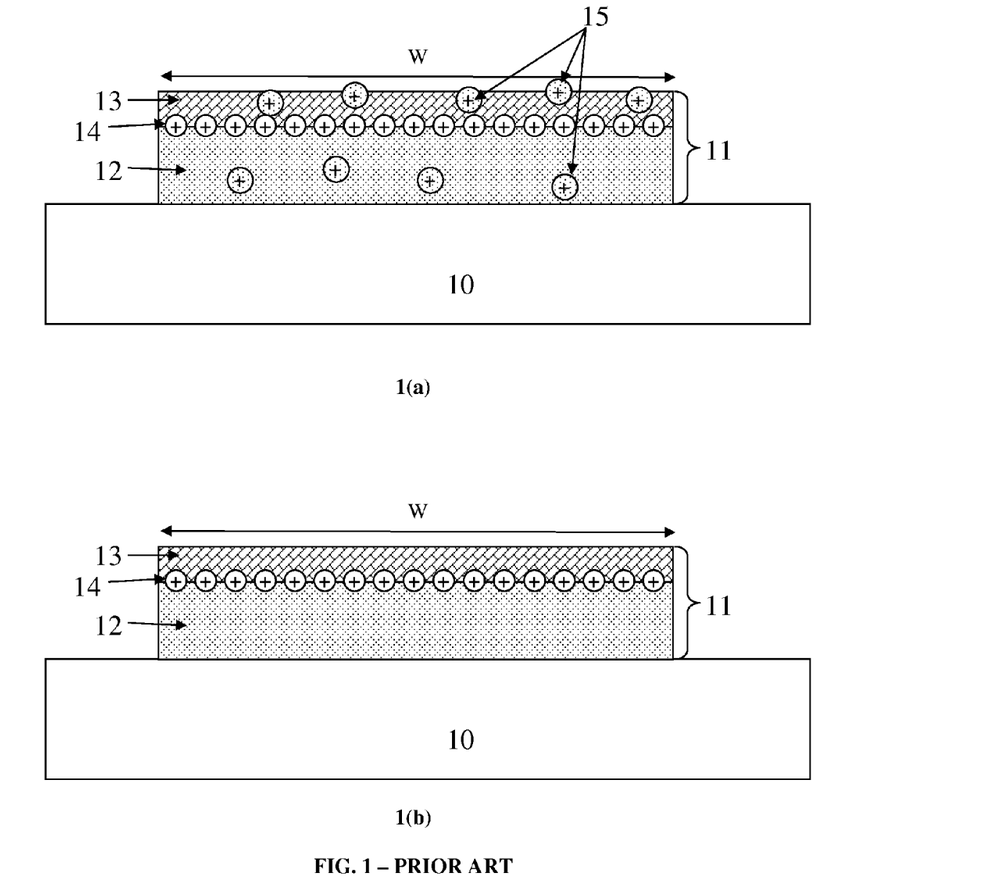
FIG. 1 shows a prior art patterned electret comprising a first patterned dielectric layer and a second patterned dielectric layer.

FIG. 1 shows a prior art electret structure 11 on a substrate 10 (e.g. semiconductor substrate such as a silicon substrate 10). The electret structure 11 shown in FIG. 1 comprises a first patterned dielectric layer 12 (e.g. a patterned silicon oxide layer), e.g. a dielectric layer 12 patterned so as to define a region where electret charges should be present, and a second patterned dielectric layer 13 (e.g. a patterned silicon nitride layer), e.g. patterned at the same location as the first patterned dielectric layer 12. At the interface between the first patterned dielectric layer 12 and the second patterned dielectric layer 13, charges, such as for example positive charges 14, are accumulated and trapped. The positive charges 14 may be injected for example by corona charging or by other methods known by a person skilled in the art. In addition, as illustrated in FIG. 1(a), distributed trapped charges 15 (space charges) may be present in the first patterned dielectric layer 12 and/or in the second patterned dielectric layer 13. These distributed trapped charges 15 in the dielectric material are less stable than the charges 14 at the interface of the dielectric layers, and may be removed by means of an appropriate treatment, such as, for example, an annealing step (at a temperature above the main Thermally Stimulated Discharge peak for space charges, for example at a temperature of 450° C.). This results in a structure as illustrated in FIG. 1(b), where the patterned electret structure 11 comprises two patterned dielectric layers 12, 13 defining the region where charges are trapped, with substantially only at the interface trapped charges 14. In alternative patterned electret structures as known in the art, a single patterned dielectric layer, such as a patterned silicon dioxide layer or a patterned silicon nitride layer, may be used instead of the double layer structure shown in FIG. 1, as for example illustrated in FIG. 2.

An important aspect of electrets or electret structures is their long-term charge stability.

Treatment at elevated temperatures has been used for charge stabilization of electrets, as, for example, reported by Leonov V. et al in "Stabilization of positive charge in $SiO_2$/$Si_3N_4$ electrets," IEEE Transactions on Dielectrics and Electrical Insulation, Vol. 13, 2006, pp 1049-1056. Surface treatment of electrets with a hydrophobic material such as octadecyl dimethyl (dimethylamino) silane or hexamethyldisilazane (HMDS) helps to stabilize the charges and thus to improve charge retention in the entire electret layer or at a predetermined part of the electret layer.

Figure 2:
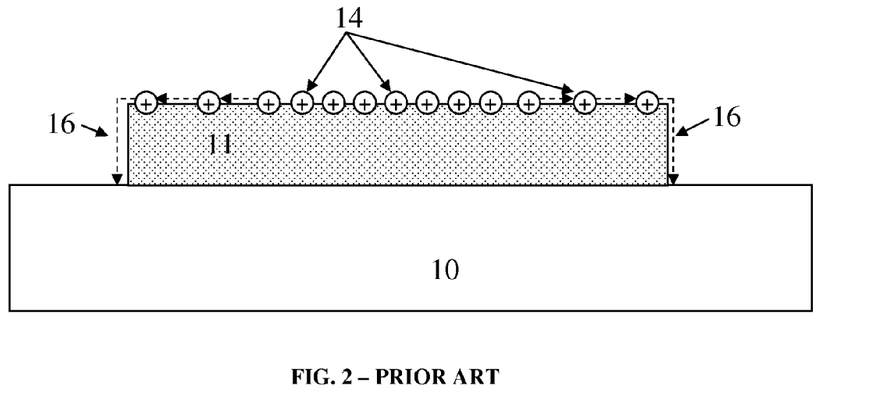
FIG. 2 illustrates the effect of leakage currents on charge stability in prior art patterned electrets.

The charge stability of prior art patterned electret structures deteriorates with decreasing dimensions of the patterns or structures, more particularly with decreasing width W of the electret structure 11. This is, for example, described for silicon dioxide electret structures by T. Genda et al in "High power electrostatic motor with micropatterned electret on shrouded turbine," Proceedings of the 13-th International Conference on Solid-State Sensors, Actuators and Microsystems, Jun. 5-9, 2005, pp. 709-712. The charge stability of the micropatterned electrets substantially deteriorated when the width decreased below several tens of microns. A leakage current 16 through the electret surface is considered as the dominant reason for the surface potential decay, as schematically illustrated in FIG. 2 (for positive charges, as an example). This effect is more pronounced for narrower structures. The charge stability can be improved by means of a surface treatment of the electret surface, leading to terminating the electrets by fluorinated silane coupling agents, for example, but this improvement is not sufficient for practical applications with small patterns (such as 10 micrometer wide patterns or smaller, for example), e.g. in MEMS devices.

Figure 3:
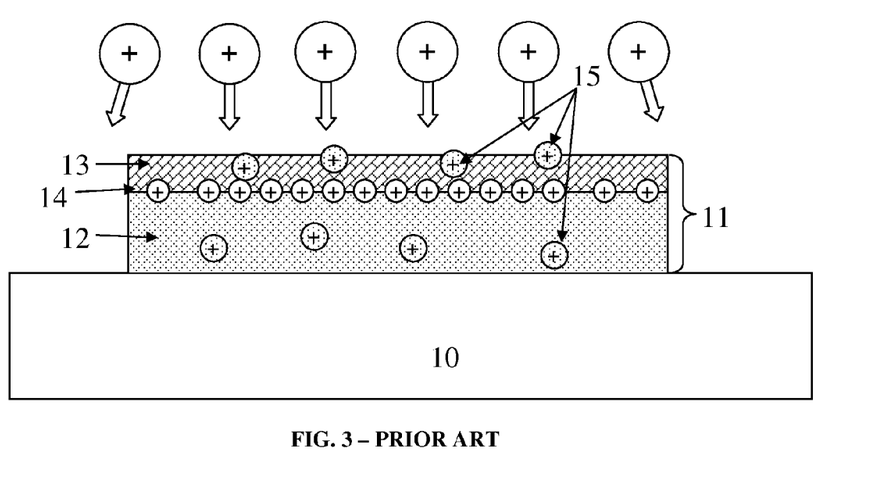
FIG. 3 illustrates a corona charging process for a prior art patterned electret.

Furthermore, it was found that, when charging a prior art patterned dielectric structure by means of corona charging, e.g. for forming a patterned electret structure, part of the charges are deviated near the edges of the patterned dielectric structure, as illustrated in FIG. 3. As a result, the smaller the width of the electret structure, the less potential can be created on the electret structure. This is related to the presence, during electret charging, of an electrically conducting or semiconducting substrate that is either grounded or has a lower potential than the electret structure. As illustrated in FIG. 3, corona charging then leads to a charge distribution with a smaller charge density near the edges of the electret structure as compared to the charge density in the center portion of the electret structure. This effect is more pronounced for electret structures with smaller dimensions. It was found that for small electret patterns (e.g. for patterns with a width lower than 400 micrometer) corona charging is very difficult or even impossible. This is illustrated in FIG. 4.

Figure 4:
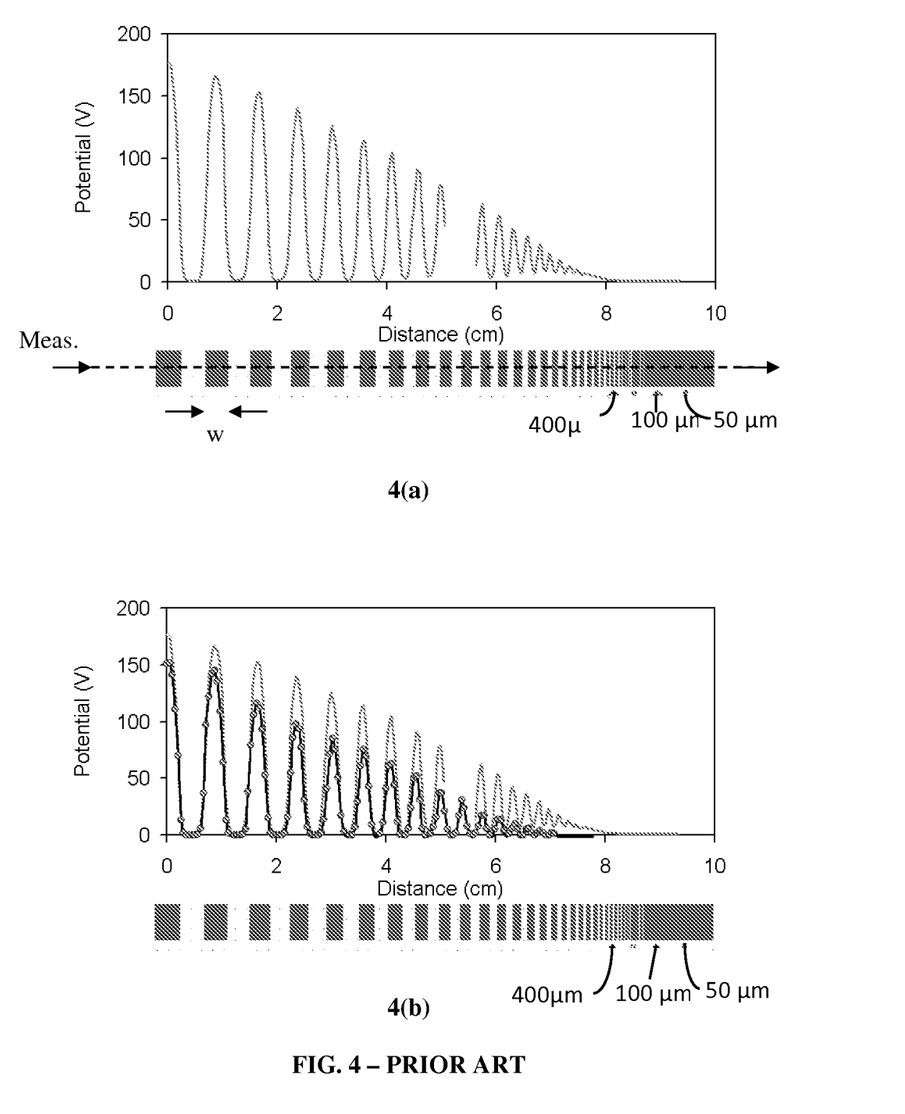
FIG. 4(a) shows the measured potential for prior art electret structures as a function of the electret width, immediately after charging.
FIG. 4(b) shows the measured potential for the electret structures of FIG. 4(a) as a function of the electret width, two days after charging.

FIG. 4 shows the potential that was measured for prior art electret structures with different widths, wherein the electret structures were charged by means of corona charging. The electret structures have a rectangular shape and comprise a 550 nm thick silicon oxide layer on a silicon wafer. FIG. 4 shows measurements of a prior art patterned electret structure comprising parallel 'lines' of electrets with decreasing width and distance. This is schematically illustrated by the black/white pattern at the bottom of the figure (the black regions corresponding to a charged region). The horizontal axis shows the distance from an edge of this structure. In the direction indicated with "distance" in FIG. 4(a) and FIG. 4(b), the width of the electret structures decreases. FIG. 4(a) shows the measured potential immediately after charging. FIG. 4(b) also shows the measured potential two days after charging. From the measurement results shown in FIG. 4(a) it can be concluded that at a width below 400 micrometer no charge is created. Furthermore, as can be concluded from the measurement results of FIG. 4(b), discharging of the electret structures is dependent on the line width of the structures. The smaller the line width of the electret structures, the faster they lose charges.

For high-resolution patterning of electrets, microelectronic technologies are used. For example, a photoresist mask is used and the electret layer is etched to remove the electret in regions that are not protected with a photoresist. However, these microelectronic processes do not provide stable electrets: the charge stability depends on the feature size, and small or narrow patterned structures are discharged very fast. Therefore, prior art methods of electret patterning may not provide sufficient charge stability in narrow electret structures (such as 10 micrometer to 100 micrometer wide lines, for example) for use in commercial devices and systems.

SUMMARY OF THE INVENTION

It is an object of embodiments of the present invention to provide stable patterned electret structures with small feature size, e.g. smaller than 500 μm. It is a further object of the present invention to provide a method for manufacturing stable patterned electret structures with small feature size.

The above objective is accomplished by a method and device according to the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

The present invention provides patterned electret layers or electret structures with good charge stability and with a charge stability that is substantially independent of the line width of the patterned electret structures. The present invention also provides methods for manufacturing such patterned electret structures. The patterned electret structures of the present invention may comprise, for example, patterns with dimension smaller than 500 micrometer, smaller than 200 micrometer, smaller than 100 micrometer, smaller than 50 micrometer, smaller than 20 micrometer, or smaller than 10 micrometer, e.g. down to 5 micrometer or even down to 2 micrometer. Patterned electret structures according to embodiments of the present invention may, for example, be used in devices such as transducers, micro-motors, micro-bearings and miniaturized power generators such as energy scavengers. It is an advantage of the patterned electret structures of embodiments of the present invention that electret charges may be stable during the lifetime of these devices (e.g. during one to ten years or more). Therefore, patterned electret structures of the present invention may be used to provide lifetime bias supplies for such microdevices, and the need for primary batteries in such devices may be avoided.

In one aspect, the present invention provides a patterned electret structure on a substrate, the patterned electret structure comprising a dielectric structure comprising at least one non-patterned dielectric layer, and further comprising a charge pattern in the dielectric structure and/or at a surface of a dielectric layer that is part of the dielectric structure and/or at an interface between dielectric layers that are part of the dielectric structure. With non-patterned dielectric layer, in the context of the present invention, is meant a dielectric layer that is not patterned so as to delimit regions where charges are present from regions where no charges are present. By the presence of the non-patterned dielectric layer, the influence of the presence of a conductive substrate (e.g. semiconductor substrate such as silicon substrate) on the charges of the electret structure is alleviated, hence increasing the charge stability over time. Moreover, in embodiments of the present invention, the charge stability is substantially independent of the width of the charge pattern (corresponding to the line width of the patterned electret structures).

The charge pattern provided is such that, in a layer comprising the charges, one or more regions with charges are alternated with one or more regions without charges.

The dielectric structure may comprise a single non-patterned dielectric layer. It may comprise a first non-patterned dielectric layer and a second dielectric layer, wherein the second dielectric layer may be patterned or not. It may further comprise at least one additional patterned or non-patterned dielectric layer. It may also comprise at least one conductive layer. In embodiments of the present invention, the patterned electret structure may furthermore comprise a further dielectric layer at edges of the patterned dielectric layer delimiting a region with charges. It is an advantage of such further dielectric layer that the influence of atmospheric ions on the electret charge stability may be substantially reduced.

A patterned electret structure according to embodiments of the present invention may form part of a microstructure making use of such patterned electret structure, such as for example a transducer, a micro-motor, a micro-bearing or a miniaturized power generator such as an energy scavenger.

In another aspect, the present invention provides a method of manufacturing a patterned electret structure. The method comprises: providing a dielectric structure on a substrate, the dielectric structure comprising at least one non-patterned dielectric layer; and providing a charge pattern in a volume or at a surface of the dielectric structure. The charge pattern is such that, in a layer comprising the charges, at least one region with charges alternates with at least one region without charges.

Providing a charge pattern may comprise charging the dielectric structure and removing charges at predetermined locations. In particular embodiments, providing a charge pattern may comprise: providing a masking layer before charging the dielectric structure; thereafter charging the dielectric structure; and thereafter removing charges in regions where a masking layer is present by, for example, performing a heat treatment (e.g. at a temperature lower than 450° C., e.g. at a temperature in the range between 300° C. and 450° C., e.g. at a temperature in the range between 350° C. and 450° C.). In alternative embodiments, providing a charge pattern may comprise charging the dielectric structure and removing charges at predetermined locations by any suitable method, for example but not limited thereto, by performing a heat treatment or by making electrical contact between the charged dielectric structure and an electrically conductive stamp or an electrically conductive mask. In particular embodiments of the present invention, the heat treatment to obtain the local discharge of the electret can be conducted using laser beam anneal, for example pulsed laser anneal. This is particularly advantageous because the thermal wave in this case does not spread to large distance in the electret plane and therefore allows creating narrow patterns. Narrow patterns are important in some modern lithographic procedures.

A method according to embodiments of the present invention may form part of a method for manufacturing a semiconductor device, such as for example transducers, micro-motors, micro-bearings and miniaturized power generators such as energy scavengers.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein. Further, it is understood that this summary is merely an example and is not intended to limit the scope of the invention as claimed. The invention, both as to organization and method of operation, together with features and advantages thereof, may best be understood by reference to the following detailed description when read in conjunction with the accompanying drawings.

BRIEF DESCRIPTION OF THE DRAWINGS

FIG. 1(a) shows the electret structure after charging. FIG. 1(b) shows the electret structure after a treatment for removing charges from shallow traps.

FIG. 5(a) illustrates a first embodiment in which a dielectric electret layer is provided at the surface of which a charge pattern is present in the form of a succession of charged and non-charged regions comprising charges in the centre of the dielectric layer and no charges there around. FIG. 5(b) illustrates another embodiment in which a dielectric electret layer is provided, at the surface of which a succession of charged and non-charged regions are provided.

Any reference signs in the claims shall not be construed as limiting the scope of the present invention.

In the different drawings, the same reference signs refer to the same or analogous elements.

DETAILED DESCRIPTION OF ILLUSTRATIVE EMBODIMENTS

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the invention is not limited hereto. The drawings included and described herein are schematic and are not limiting the scope of the invention. It is also noted that in the drawings, the size of some elements may be exaggerated and, therefore, not drawn to scale for illustrative purposes.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

Embodiments of the present invention are further described for inorganic electret layers. However, the invention is not limited thereto and may also be used for organic electret layers.

Embodiments of the present invention are further described for electret layers having positive trapped charges. However, the present invention can also be used for electret layers having negative trapped charges.

The present invention provides patterned electret structures having a good stability, optionally a better charge stability than prior art electret structures, and a limited dependence of the charge stability on the width of the electret structures, optionally less dependence as compared to prior art solutions, and preferably no dependence at all.

A patterned electret structure according to embodiments of the present invention comprises a dielectric structure comprising at least one non-patterned dielectric layer, and a charge pattern in the dielectric structure and/or at a surface of a dielectric layer of the dielectric structure (e.g. at an interface of a first dielectric layer and a second dielectric layer comprised in the dielectric structure). A non-patterned dielectric layer, in the context of the present invention, is defined as a dielectric layer that is not patterned so as to delimit regions where charges are present from regions where no charges are present. It is an advantage of a patterned electret structure according to embodiments of the present invention that the dependence of charge stability on the electret width is avoided or substantially reduced as compared to prior art patterned electret structures. It is an advantage of a patterned electret structure according to embodiments of the present invention that during corona charging for forming the charge pattern in the electret structure, deviation of the charges is avoided or substantially reduced, such that a good charge uniformity is obtained in the patterned electret structure, optionally a better charge uniformity as compared to prior art solutions. The present invention also provides methods for manufacturing patterned electret structures.

In the context of the present invention, "patterned electret" or "patterned electret structure" refers to a dielectric structure with a charge pattern in the bulk of a dielectric layer, in the plane of the surface of the dielectric layer or in the plane of the interface between two dielectric layers, more in particular a dielectric structure comprising regions with charges and regions without charges or with fewer charges. A charge pattern in the context of the present invention is a succession of regions with and regions without charges. The dielectric structure referred to comprises at least one non-patterned dielectric layer, i.e. at least one dielectric layer which is not patterned so as to delimit, within the electret structure, regions with charges from regions without charges. It may further comprise one or more patterned or non-patterned dielectric layers and it may comprise one or more electrically conductive layers.

In embodiments of the present invention a patterned electret layer is formed by providing a charge pattern in a dielectric structure, wherein the dielectric structure comprises at least one non-patterned dielectric layer. By providing a charge pattern, an electret structure comprising regions with charges and regions without charges or with less charges, in the plane of the surface of the dielectric layer or in the plane of the interface between two dielectric layers, is obtained, i.e. a dielectric structure comprising regions with a high(er) potential and regions with a low(er) potential is obtained.

Figure 5:
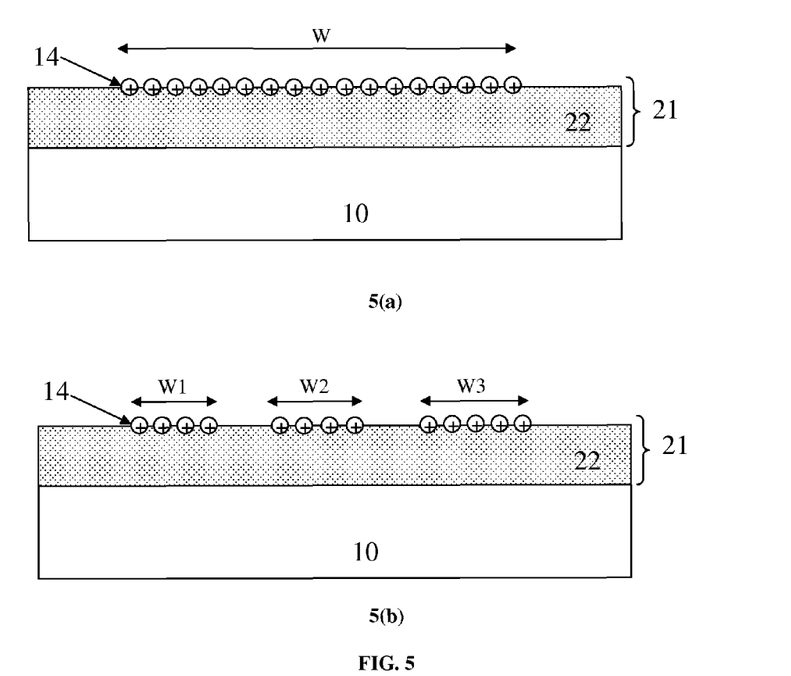
FIG. 5 illustrates patterned electret structures according to an embodiment of the present invention wherein the electret structure comprises a non-patterned dielectric layer, i.e. a dielectric layer which is not patterned so as to delimit regions where charges are present from regions where no charges are present.

An electret structure 21 according to an embodiment of the present invention is schematically shown in FIG. 5. The electret structure 21 shown in FIG. 5($a$) has a charge pattern forming a single patterned feature with charges with width W, surrounded by regions without charges. Hence the width W is smaller than the width of the non-patterned dielectric layer 22. FIG. 5($b$) shows an electret structure 21 comprising a charge pattern forming three patterned features. The electret structure 21 comprises three regions with charges (width W1, W2, W3, respectively) and regions without charges in between the charged regions. As illustrated in FIGS. 5($a$) and 5($b$), an electret structure 21 of the present embodiment of the invention comprises at least one non-patterned layer of a dielectric material 22 on a substrate 10. The substrate 10 may comprise or consist of any suitable material, such as for example an inorganic material (e.g. glass), an organic material (e.g. a polymer film), a dielectric (e.g. an oxide or a nitride), an electrically conductive material (e.g. metal), or a semiconductor material (e.g. silicon).

Figure 6:
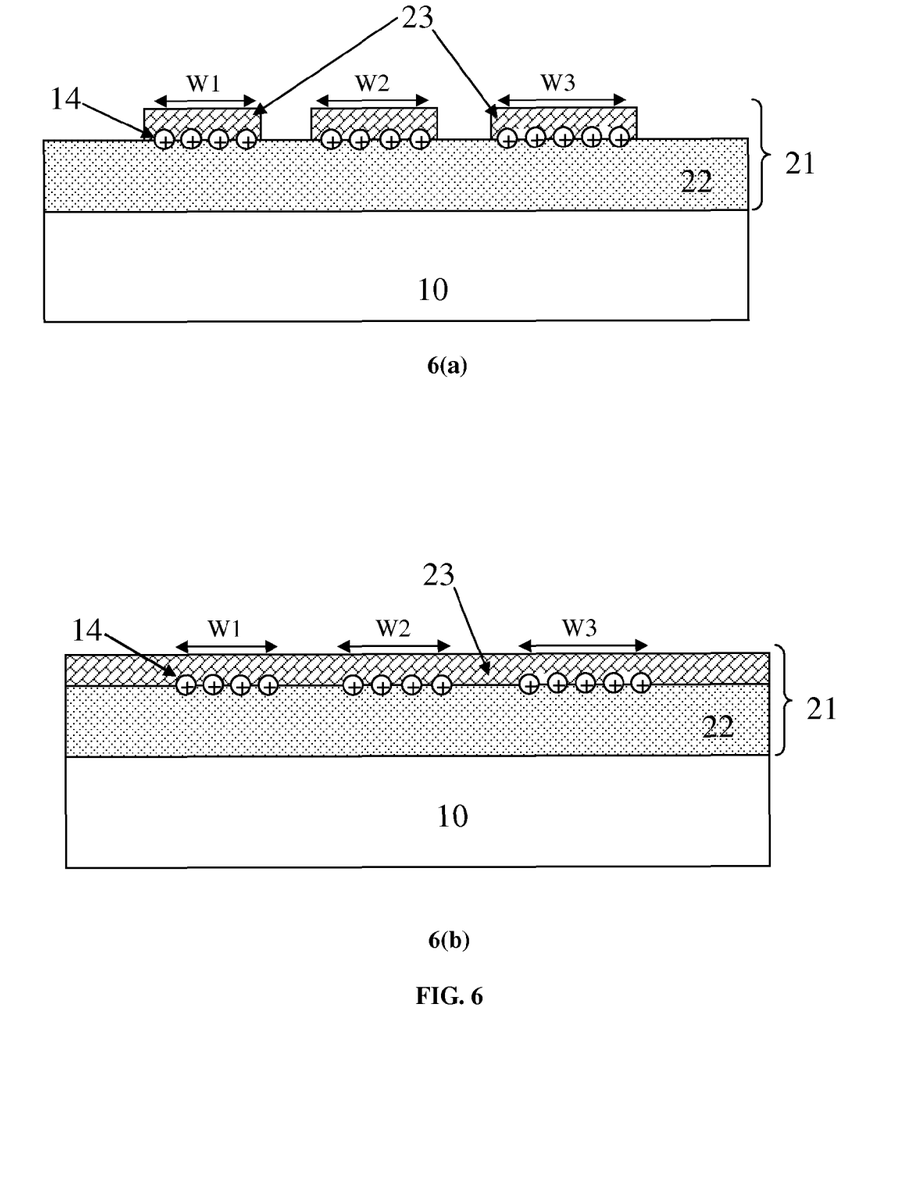
FIG. 6(a) illustrates a patterned electret structure according to an embodiment of the present invention wherein the electret structure comprises a non-patterned dielectric layer and a patterned dielectric layer.
FIG. 6(b) illustrates a patterned electret structure according to an embodiment of the present invention wherein the electret structure comprises two non-patterned dielectric layers.

Electret structures 21 according to embodiments of the present invention wherein the electret structures comprise a first non-patterned dielectric layer 22 and a second dielectric layer 23 are illustrated in FIG. 6($a$) and FIG. 6($b$). The second dielectric layer 23 may be a patterned layer or a non-patterned layer. A two-layer electret structure or double layer electret structure as shown in FIG. 6($a$) and FIG. 6($b$), wherein the first dielectric layer 22 may for example comprise or consist of $SiO_2$ and wherein the second dielectric layer 23 may for example comprise or consist of $Si_3N_4$, and wherein charges are trapped between the first dielectric layer 22 and the second dielectric layer 23, may provide better charge stability as compared to electret structures with only one dielectric layer (as for example shown in FIG. 5($a$) and FIG. 5($b$)). Therefore, a double layer electret structure as illustrated in FIG. 6($a$) and FIG. 6($b$) may preferably be used. Although some drawings show electret structures with a single dielectric layer, and although some embodiments and examples of electret structures are described with a single dielectric layer, the invention is not limited thereto, and double layer electret structures or multiple layer electret structures may be used instead of single dielectric layer electret structures. Although in the example shown in FIG. 6(a) a non-patterned dielectric layer 22 is provided on the substrate 10 and a patterned dielectric layer 23 is provided on the non-patterned dielectric layer 22, other configurations are possible. For example, on the substrate 10 first a patterned dielectric layer may be provided and then a non-patterned dielectric layer me be formed.

Figure 7:
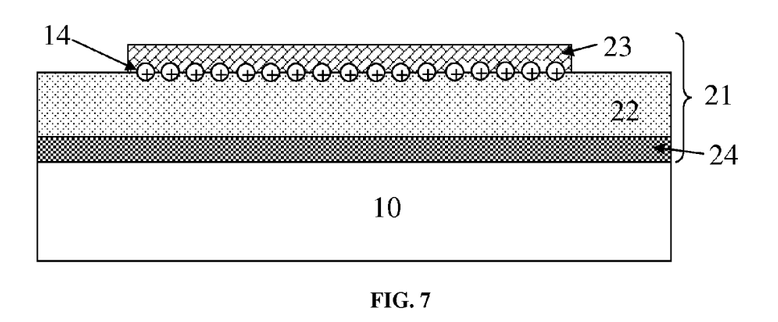
FIG. 7 illustrates a patterned electret structure according to an embodiment of the present invention wherein the electret structure comprises two non-patterned dielectric layers and a patterned dielectric layer.

Another example of an electret structure 21 according to embodiments of the present invention is shown in FIG. 7. The electret structure 21 comprises, apart from the first dielectric layer 22 and the second dielectric layer 23, a third dielectric layer 24 in between the substrate 10 and the first dielectric layer 22. This third dielectric layer 24 is preferably a layer comprising a very low number of defects that may serve as charge traps. For example, layer 24 may comprise SiC or a diamond-like material.

Figure 8:
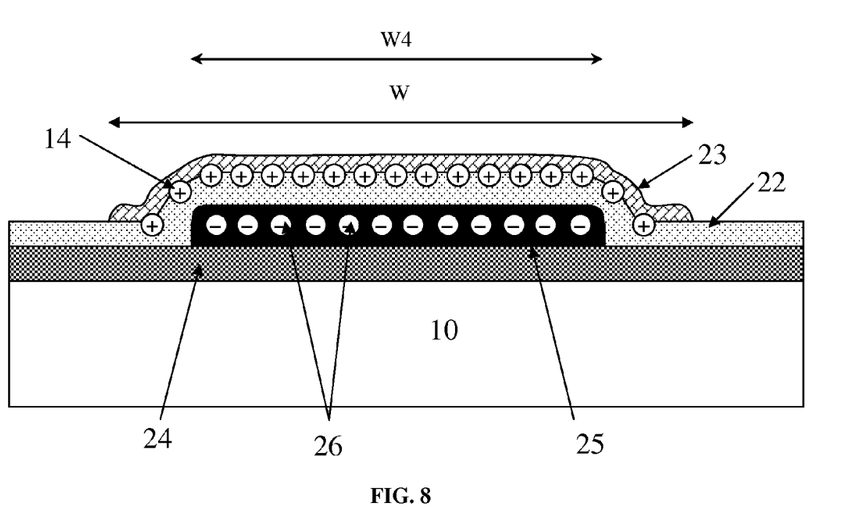
FIG. 8 shows a patterned electret structure according to an embodiment of the present invention wherein the structure comprises a patterned electrically conductive layer that may serve as en electrode in a device.

FIG. 8 illustrates a patterned electret structure 21 according to another embodiment of the present invention wherein the structure comprises, underneath the first non-patterned dielectric layer 22, a patterned electrically conductive layer 25 that may serve as an electrode in a device. It is preferred that the width W4 of the patterned electrically conductive layer 25 is smaller than the width W of the electret pattern (which is smaller than the corresponding dimension of the non-patterned layer 22).

Figure 9:
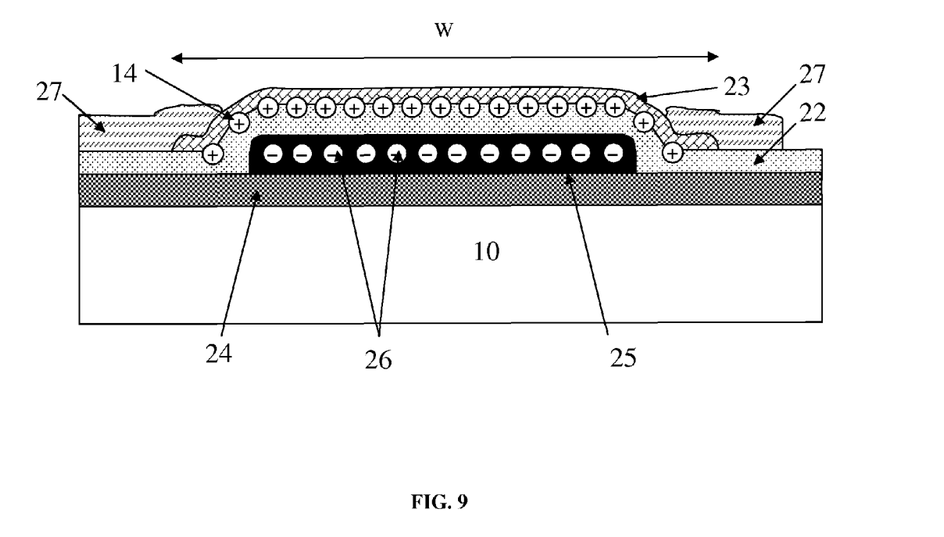
FIG. 9 illustrates a patterned electret structure according to an embodiment of the present invention wherein the electret structure comprises a dielectric layer at the edges of the charged regions.

FIG. 9 illustrates a patterned electret structure 21 according to yet another embodiment of the present invention wherein the electret structure comprises a fourth dielectric layer 27 at the edges of the charged regions at the interface between the first and the second dielectric layers 22, 23. In the absence of such a fourth dielectric layer 27 (i.e. the embodiment illustrated in FIG. 8), a fringing field at the edges of the charged region of the electret structure may attract atmospheric ions, which may lead to a loss of charges. In the presence of the fourth dielectric layer 27, the influence of atmospheric ions on the electret charge stability may be substantially reduced.

Figure 10:
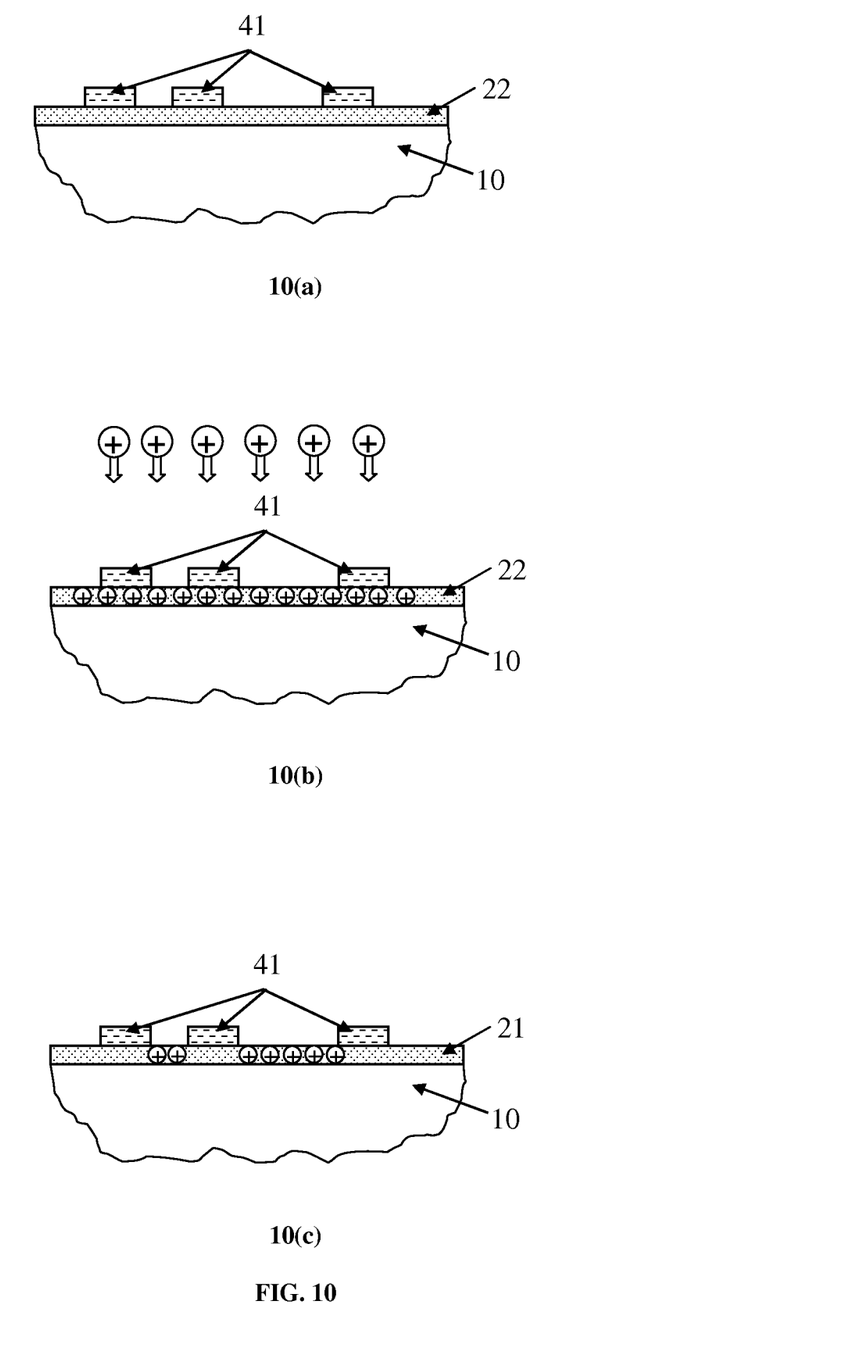
FIG. 10 illustrates a method of manufacturing a patterned electret structure according to a first embodiment of the present invention, different steps of the method being illustrated in FIG. 10(a) to FIG. 10(c).

A method for manufacturing an electret structure 21 according to an embodiment of the present invention is schematically illustrated in FIG. 10. The method may comprise providing a dielectric structure (e.g. a non-patterned dielectric layer 22 on a substrate 10 (again with non-patterned dielectric layer is meant, in the context of the present invention, a dielectric layer which is not patterned so as to delimit electret regions with charges from electret regions without charges); providing a masking layer 41 on the dielectric structure (e.g. by providing a layer of a photosensitive material, a material sensitive to electromagnetic radiation, heat or temperature, by any suitable means such as for example spinning, spray coating, electrodeposition); and patterning that masking layer by any patterning method known by a person skilled in the art. The result is a patterned masking layer 41 on the dielectric layer 22 (FIG. 10(a)). In particular embodiments of the present invention, the masking layer may be made from a material which becomes electrically conductive when heated, so that charges can be removed. An example thereof is a photoresist masking layer. After providing the patterned masking layer 41, charging of the dielectric structure may be done (FIG. 10(b)) by any suitable method known by a person skilled in the art, such as, for example, contact charging, liquid charging, electron or ion beam charging, or corona charging, thereby forming a non-patterned electret layer. By charging the dielectric structure, charges distribute over the dielectric layer, e.g. over the dielectric layer surface, despite the presence of the masking layer 41. Although the manufacturing method is illustrated in FIG. 10 for an electret structure 21 comprising a single dielectric layer 22, the method may also be used for forming an electret structure 21 comprising two or multiple dielectric layers, in which case the charges may e.g. distribute at the interface between two dielectric layers. Starting from the non-patterned electret layer as for example shown in FIG. 10(b)), a patterned electret structure 21 according to the present invention can then be formed for example by applying a heat treatment to the samples (e.g. in a furnace) as described in the examples below. By the heat treatment, charges disappear at locations where the patterned masking layer 41 is present. Thereafter, the masking layer 41 may be removed. A method for manufacturing an electret structure 21 may in addition comprise annealing (e.g. for removing charges trapped in shallow traps) as well as surface treatment (e.g. with a hydrophobic material).

Two types of electret structures 21 were fabricated using a manufacturing method according to an embodiment of the present invention. The first electret structure comprised a 0.5 micrometer thick non-patterned $SiO_2$ dielectric layer 22. This $SiO_2$ layer 22 was formed by thermal oxidation of a silicon substrate 10; however, the invention is not limited thereto and the dielectric layer may be provided in any other suitable way, such as for example by deposition. The second electret structure comprised a 0.1 micrometer thick non-patterned $Si_3N_4$ layer 23 on top of a 0.5 micrometer thick non-patterned $SiO_2$ dielectric layer 22. A photoresist layer 41 (IX845 photoresist) was provided on top of the dielectric structures and patterned by photolithographic means. Patterning of the photoresist layer was such that, after patterning, one part of the photoresist structures were isolated from the substrate, i.e. the resist pattern consisted of resist islands on the non-patterned dielectric layers. The remaining part of the photoresist was in connection with the substrate, i.e. resist was provided at edges of the non-patterned dielectric layers. After providing the resist pattern, the samples were placed in a furnace at a pre-determined temperature/time pattern, for example sequentially: 20 minutes at 90° C., 20 min at 160° C. and 20 min at 450° C. The reason for this succession of different temperatures is related to drying (removal of water) of the resist layer. Therefore the first temperature is lower than the boiling point of water. If one would go immediately to the highest temperature, this would lead to water, bubbles in the resist. The second temperature is for further baking the resist, and the highest temperature leads to a kind of burning of the resist. Then a surface treatment with vapour hexametildisilazane (HMDS) was performed for further charge stabilisation. The dielectric structure was then charged using corona charging, using a tip voltage of 8 kV and a grid voltage of 1.2 kV. Upon charging, a uniform charge was created in the dielectric structure, e.g. the dielectric layer 22 or the interface between the first and the second dielectric layers, e.g. the $SiO_2$ and the $Si_3N_4$ layers, for samples comprising isolated islands of photoresist. However, no charge was created in regions covered with a photoresist layer that was in contact with the substrate.

Based on this, a patterned electret structure 21 (e.g. a patterned electret structure with small dimensions such as dimensions below 400 micrometer, below 100 micrometer, below 20 micrometer, below 10 micrometer, down to 5 micrometer or below 5 micrometer down to 2 micrometer can be formed wherein the electret structure comprises a non-patterned dielectric layer with a predetermined charge pattern. In an experiment, some samples with double-layer electret structure were not placed in the furnace after providing the resist pattern and before charging. These samples did not have a charge pattern after completing the manufacturing process, but rather they had a substantially homogeneous layer of charges (as illustrated in FIG. 10(b)). For these samples a modified process was applied. These samples were placed in the furnace only after charging, at a pre-determined temperature/time pattern, for example sequentially: 20 min at 160° C. and 20 min at 450° C. Upon this high-temperature treatment, a charge pattern was successfully created in regions covered with a photoresist that was in contact with the substrate. A possible explanation may be melting of photoresist, thereby temporarily allowing some ionic conduction and discharging of the covered zones connected to the substrate.

From the above experiments, it can be understood that heating of a photoresist mask leads to a conductive pattern which causes local discharging of an electret layer and hence creates the charge pattern in accordance with embodiments of the present invention at those locations where the photoresist mask is present which is in contact with the substrate or an electrically conductive layer. If the photoresist mask is not in electrical contact with the substrate or an electrically conductive layer, no charge pattern in accordance with embodiments of the present invention is formed. The heating of the photoresist mask can be performed before or after charging the electret structure; in both cases it leads to the same result.

Figure 11:
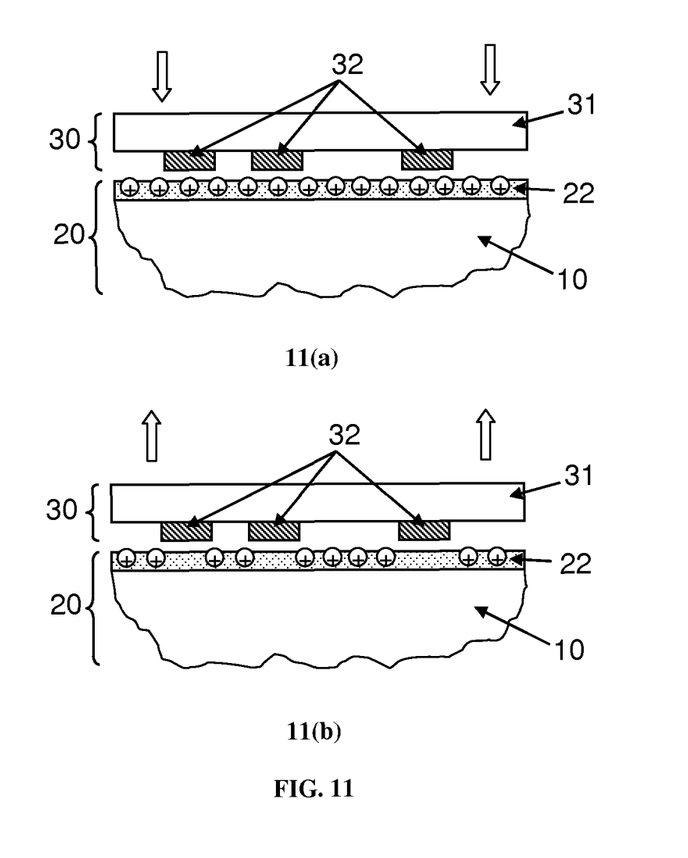
FIG. 11 illustrates a method of manufacturing a patterned electret structure according to a second embodiment of the present invention, different steps of the method being illustrated in FIG. 11(a) and FIG. 11(b).

Another example of a manufacturing method according to embodiments of the present invention is illustrated in FIG. 11. After deposition or formation of a dielectric layer, e.g. a $SiO_2$ layer 22, on a substrate 10 and after an optional treatment with HMDS, charging of the dielectric layer, e.g. $SiO_2$ layer 22, is performed. The charges are applied on the surface of the dielectric layer as a homogeneous layer. For creating the charge pattern, a selective discharging is performed, for example by means of a stamp 30 that is separately fabricated. For example, a stamp 30 may be fabricated on a substrate 31 such as, for example, a semiconductor, e.g. silicon, wafer and may comprise a patterned layer 32 of an electrically conductive material such as, for example, a metal. Alternatively, a patterned electrically conductive substrate with a predetermined topography may be used as a stamp 30. This topography can, for example, be provided by etching a pattern in an electrically conductive substrate such as for example a conductive semiconductor, e.g. silicon, wafer. The topography of the stamp 30 preferably comprises features with a height of more than 0.5 micrometer, and preferably more than 2 micrometer, in order to avoid discharging of the electret by field emission. The stamp 30 is placed in contact with the charged dielectric layer 22 and electrically connected to the electrically conductive substrate 10 or to an electrically conductive layer (e.g. electrode). The electret layer 22 is then discharged in regions where the electret layer 22 is in contact with the stamp 30, such that a charge pattern is created and a patterned electret layer according to an embodiment of the present invention is obtained. The potential of the stamp 30 is preferably of the opposite polarity as compared with the potential of the electret for faster discharging. Depending on the particular electret layers used, a heat treatment can be performed to accelerate the discharge process by thermally stimulated mobility of charges. Upon creating the charge pattern, the stamp 30 can be removed.

Figure 12:
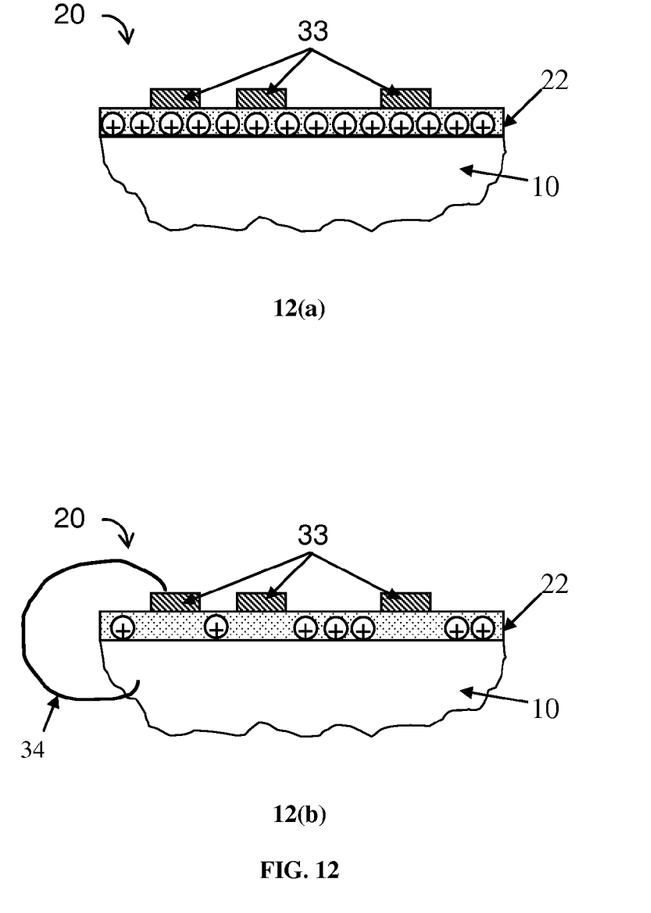
FIG. 12 illustrates a method of manufacturing a patterned electret structure according to a third embodiment of the present invention, different steps of the method being illustrated in FIG. 12(a) and FIG. 12(b).

Another example of a manufacturing method for an electret structure 22 according to an embodiment of the present invention is shown in FIG. 12. Upon deposition of a dielectric layer 22 (e.g. a $SiO_2$ layer) an electrically conductive layer 33 (e.g. a metal layer) is deposited on the dielectric layer 22 and patterned. Then, after treatment with, for example, a HMDS layer, discharging of the dielectric layer 22 is performed by electrically connecting the electrically conductive layer 33 e.g. to the substrate 10 or to an electrically conductive layer (e.g. electrode), for example, by providing an electrically conductive wire 34 between the substrate 10 and the metal layer 33 (FIG. 12(b)). Depending on the particular electret layers used, a heat treatment can be performed to accelerate the discharge process by thermally stimulated mobility of charges. The regions of the dielectric layer 22 which are covered with a pattern of the electrically conductive layer 33 are then discharged, while in the regions not covered by an electrically conductive layer 33 the charge remains. In this way a charge pattern can be created in the dielectric layer 22, such that a patterned electret structure 21 is obtained. After creating the charge pattern, the electrical connection (e.g. the wire 34) between the substrate 10 and the electrically conductive layer 33 can be removed. Instead of electrically connecting the metal layer 33 with the substrate 10 by means of an electrically conductive wire 34, a voltage can be provided between the metal layer and the substrate, for example, by electrically connecting a voltage source between the metal layer 33 and the substrate 10. Preferably the potential of the metal layer 33 is of the opposite polarity as compared to the potential of the charged dielectric layer 22.

An electret structure 21 comprising a first unpatterned dielectric layer 22 and a second patterned dielectric layer 23 as shown in FIG. 6(a) can be manufactured as described hereinafter. Upon deposition of a first dielectric layer 22 such as, for example, a $SiO_2$ layer, a second dielectric layer 23 such as, for example, a $Si_3N_4$ layer is deposited on the first dielectric layer 22 and patterned. Preferably the sample is then annealed for dehydration, for example at a temperature in the range between 350° C. and 450° C. Then, an HMDS layer is provided, preferably in situ (in the annealing furnace) or before cooling the sample below 150-100° C. Charging is then performed and the sample is placed in a furnace at a temperature in the range between 350° C. and 450° C., for a pre-determined period of time (e.g. in the range between 5 min and 60 min, such as in the range between 10 min and 30 min). The temperature range is related to Thermally Stimulated Discharge: in this temperature range, charges at the interface between the oxide and the nitride are still stable and thus they remain at the interface. However, charges in the bulk and at the dielectric layer surfaces are less stable and in this temperature range these charges disappear ('thermally stimulated discharge'). This high temperature treatment in a furnace results in discharging at locations where a single dielectric layer 22 is present on the substrate. The charges leak to the substrate. At locations where double dielectric layer is present, charges remain at the interface between the first dielectric layer 22 and the second dielectric layer 23. In this way a charge pattern is created in the dielectric stack and a patterned electret structure 21 is obtained. Then, preferably an HMDS layer can be provided for a second time, preferably in situ or before cooling the sample below 150-100° C.

In particular embodiments of the present invention, where charges are present in between a double layer of dielectric material, the charge pattern may be obtained for example by methods as illustrated in FIG. 10, 11 or 12 and described hereinabove. Charges are removed by applying a few 100V, which approaches the break down field of the dielectric layer such that charges can leak away and the required charge pattern is generated.

Figure 13:
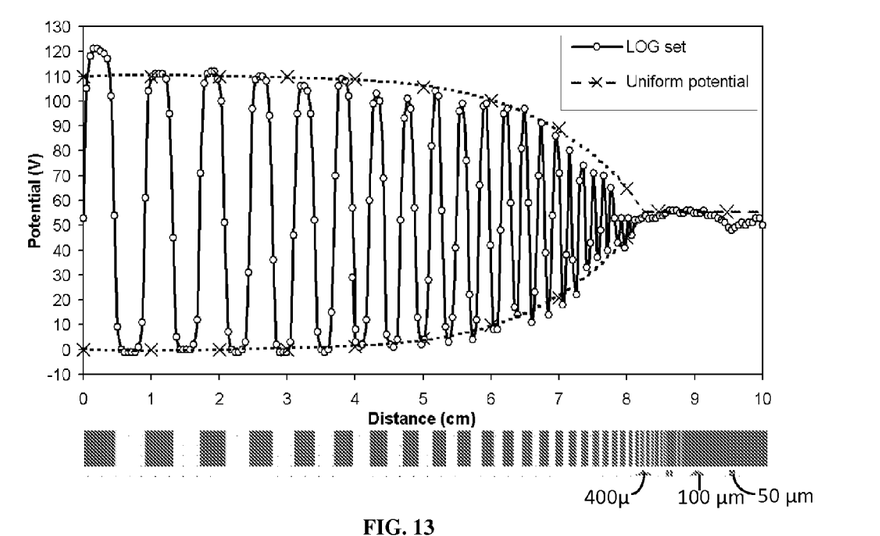
FIG. 13 shows the measured potential for an electret structure according to an embodiment of the present invention, comprising $Si_3N_4$ rectangles with different widths on a 550 nm thick non-patterned $SiO_2$ layer, as a function of the electret width.

FIG. 13 shows the potential as a function of the width of patterned electret structures according to an embodiment of the present invention. The electret structures comprise $Si_3N_4$ rectangles of different widths on top of a 550 nm thick non-patterned $SiO_2$ layer. Because the measurement tool is limited in spatial sensitivity, for the narrow lines average potential values are shown. From FIG. 13 it can be concluded that a charge is created in the patterned electret structures, even for line widths below 50 micrometer (as opposed to what is shown in FIG. 4(a) for prior art electret structures). From FIG. 13 it can also be concluded that in the line width range between 500 micrometer and 20 micrometer there is no dependence of the potential on the line width.

Figure 14:
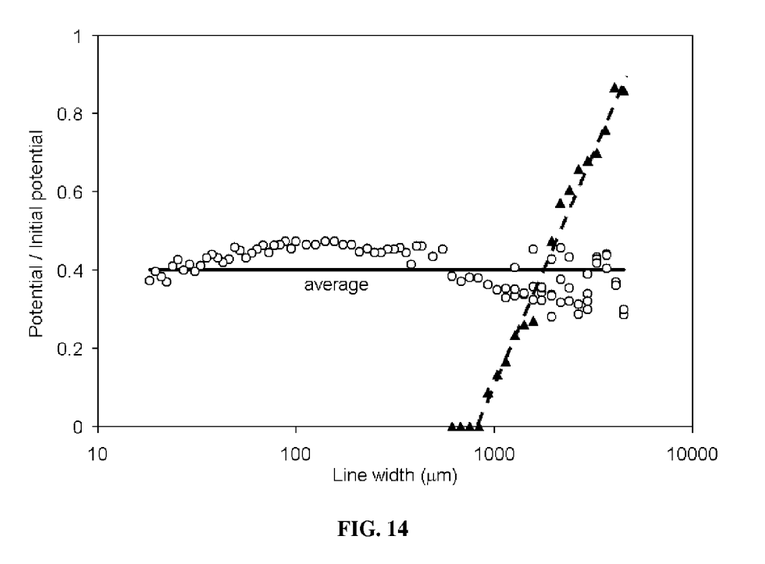
FIG. 14 shows the change in potential of patterned electret structures as a function of line width, for patterned electret structures according to an embodiment of the present invention one year after fabrication (solid line, circles) and for prior art patterned electret structures two days after fabrication (dashed line, triangles).

FIG. 14 shows the change in potential of patterned electret structures as a function of line width. The solid line and circles correspond to measurements that were performed one year after fabrication on patterned electret structures of an embodiment of the present invention, the patterned electret structures comprising lines of $Si_3N_4$ on a non-patterned $SiO_2$ layer. These patterned electret structures were formed by providing on a substrate a dielectric structure comprising a 0.5 micrometer thick thermal $SiO_2$ layer and a 0.1 micrometer thick LPCVD $Si_3N_4$ layer. The $Si_3N_4$ layer was patterned by dry etching, and the $SiO_2$ layer remained non-patterned. After corona charging of this dielectric structure, both the regions comprising only a single $SiO_2$ layer and the regions comprising a $SiO_2/Si_3N_4$ layer ('double layer') were charged. After charging, a higher potential was observed in the double layer structure as compared to the single layer structure. A post-charging anneal was performed at 450° C. for 10 minutes. This step removes charges from shallow traps in the $S_{i3}N_4$ and $SiO_2$ layers, thereby forming a better charge pattern in terms of difference in potential between maxima and minima. The dashed line and triangles in FIG. 14 correspond to measurements that were performed two days after fabrication on prior art $SiO_2$ electret lines. It can be concluded that for such prior art electret structures there is a strong dependence of charge stability on line width. For electret lines wider than about 1 mm, the remaining potential after two days scales linearly with the electret line width. Furthermore, prior art electret structures with lines narrower than 1 mm are completely discharged two days after fabrication. The charge stability in electret lines according to embodiments of the present invention is independent of the line width, even one year after fabrication. For the $SiO_2/Si_3N_4$ electret structure shown in FIG. 14, after one year of aging about 40% of the initial potential was remaining, independent of the line width, down to a line width of 20 micrometer.

Experiments have shown that the discharge of electret patterns as well as of electret film samples on their edges is related to the fringing field in presence of field emission and natural atmospheric ionization. Therefore, the space charge and the charge on interfaces of dielectric layers which are located away from the outer surface of the electret, are more stable as compared with the charge stored on the outer surface of the electret. In particular embodiments of the present invention, to further encapsulate the fringing field in the layers and thereby decrease it in the air, it is advantageous to use dielectric layers with high dielectric constant. In particular embodiments, vacuum packaging of electret-containing devices can help to improve the stability of the electret.

The water molecules in the air are also a source of ions which can be attracted to the electret surface and cause degradation of the electret. Therefore, it is advantageous to provide waterproof encapsulation of the electret-based devices. Furthermore, an encapsulation also serves as a dust-protection which is important for MEMS-based components.

Figure 15:
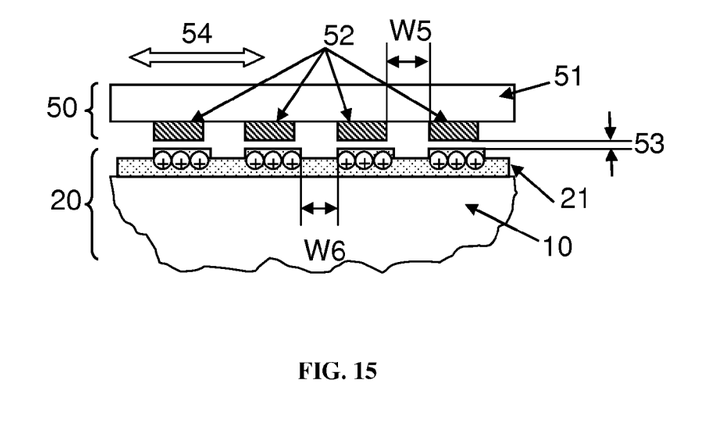
FIG. 15 illustrates an electrostatic energy harvester which includes an electret structure according to an embodiment of the present invention.

In electret-based components, the width of the pattern may be an important parameter. As an example, an electrostatic energy harvester is considered, for converting mechanical vibrations of the harvester into relative movement of a mass and an electret pattern to each other, and then converting the related capacitance change into an ac-current in the electrical circuit. Such an energy harvester, as illustrated in FIG. 15, could comprise an electret structure 20 fixed to a device case and a movable part 50, moveable with respect to the electret structure 20, comprising a mass 51 and a conductive, e.g. metal, pattern 52 suspended at a small distance 53 from the electret structure 20. The distance 53 between the charge pattern provided in dielectric layer 21 of the fixed electret structure 20 and the conductive pattern 52 on the moveable part 50 must preferably be small for better performance characteristics of the energy harvester. The distance 53 must preferably be less that the width W of the charge pattern and the conductive pattern 52, and less than the distance W5 between adjacent elements (lines) of the conductive pattern 52, and less than the distance W6 between the adjacent elements (lines) of the charge pattern of the electret structure. Ideally, the power generated by such a device is reversely proportional to the distance 53 between the electret structure 20 and the conductive pattern 52 of the moveable part 50.

Depending on the application, i.e., depending on the particular spectrum of the vibrations in x, y, and z direction, the minimal distance 53 can be e.g. 1-2 μm. The corresponding charge pattern in the electret structure 20 and the corresponding conductive pattern 52 could have a feature size of 2-5 μm. Increasing the feature size of the patterns at other equal conditions would cause decreasing the power output, typically, reversely proportional to the feature size. Therefore, narrow lines (with dominating linear vibrations), or small squares, in case of 2D-vibrations (or other structural forms) are required on both electret structure 20 and counter electrode 52.

At high electret voltage, e.g. 200-300 V and small distance 53, e.g. 1-2 μm, the quantum mechanical field emission of electrons from the cathode results in lower breakdown voltage than the one predicted by Paschen's law. In this case, the negatively charged electret could show better charge retention than the positively charged one, at the same trap energy. This is because in case of negatively charged electret the cathode is electret and electrons tunneling into air from metal anode return back by the electric field. However, e.g. in case of $SiO_2/Si_3N_4$ electret, the general observation, according to literature, is that negative traps show better trap energy, so that both, positive and negative electret could be useful for the application under discussion. Furthermore, in case of positively charged electret, the pattern 52 can be coated by a thin dielectric layer to prevent field emission.

The fringing field existing in such structure causes increased adverse effect of field emission of stability of electret near the edges of patterns in electret and in pattern 52 because electric field is concentrated at the pattern edges. As far as in a real energy harvester the edges of pattern 52 typically move in respect to electret pattern due to vibrations, the entire electret is subjected to the discharge due to field emission from the cathode. In addition, the presence of natural atmospheric ions further accelerates the electret discharge. Therefore, to increase the service life of patterned electret-based devices, tight encapsulation of such devices is advantageous.

In case the pattern 52 is not coated with a dielectric layer, the field emission can be practically perfectly blocked if the distance 53 is made larger, e.g. 5-to-10 μm. Experiments have shown that at a distance of 8.5 μm and a potential in the electret structure 21 of 100 V, the charge loss during the first year of storage on open air decreases by a few percent offering the acceptable service life of the electret-based devices. This increase of the distance 53 requires wider feature size, e.g. 5 to 20 μm. This increase of the feature size however results in almost proportional loss in power generated by the vibration energy harvester discussed above.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

The invention claimed is:

1. A patterned electret structure on a substrate, the patterned electret structure comprising:
 a dielectric structure comprising at least a first non-patterned dielectric layer and a second dielectric layer; and
 a charge pattern at an interface between the first non-patterned dielectric layer and the second dielectric layer, the charge pattern comprising at least one region with charges and at least one region without charges, wherein, in a layer comprising the at least one region with charges and the at least one region without charges, regions with charges alternate with regions without charges, wherein each of the at least one region with charges has a line width less than 500 micrometers, and wherein the charge pattern is stable for at least one year.

2. The patterned electret structure according to claim 1, wherein the second dielectric layer is not patterned.

3. The patterned electret structure according to claim 1, wherein the second dielectric layer is patterned.

4. The patterned electret structure according to claim 1, further comprising at least one additional patterned or non-patterned dielectric layer.

5. The patterned electret structure according to claim 1, further comprising at least one conductive layer.

6. The patterned electret structure according to claim 3, further comprising a further dielectric layer at edges of the patterned second dielectric layer delimiting a region with charges.

7. The patterned electret structure according to claim 1, wherein the at least one non-patterned dielectric layer is a dielectric layer which is not patterned so as to delimit regions with charges from regions without charges.

8. A method of manufacturing a patterned electret structure, the method comprising:
 providing a dielectric structure on a substrate, the dielectric structure comprising at least a first non-patterned dielectric layer and a second dielectric layer; and
 providing a charge pattern at an interface between the first non-patterned dielectric layer and the second dielectric layer, the charge pattern comprising at least one region with charges and at least one region without charges, wherein, in a layer comprising the at least one region with charges and the at least one region without charges, regions with charges alternate with regions without charges, wherein each of the at least one region with charges has a line width less than 500 micrometers, and wherein the charge pattern is stable for at least one year.

9. The method according to claim 8, wherein providing a charge pattern comprises charging the dielectric structure and removing charges at predetermined locations.

10. The method according to claim 9, wherein providing a charge pattern comprises, before charging the dielectric structure, providing a masking layer, and
 wherein removing charges at predetermined locations comprises removing charges at locations where a masking layer is present.

11. The method according to claim 10, wherein removing charges in regions where a masking layer is present comprises performing a heat treatment.

12. The method according to claim 9, wherein removing charges at predetermined locations comprises making electrical contact between the charged dielectric structure and an electrically conductive stamp or an electrically conductive mask.

13. A patterned electret structure on a substrate, the patterned electret structure comprising:
 a dielectric structure comprising at least a first non-patterned dielectric layer and a second dielectric layer, and further comprising a charge pattern at an interface between the first non-patterned dielectric layer and the second dielectric layer, the charge pattern being such that, in a layer comprising the charges, region(s) with charges are alternated with region(s) without charges, characterized in that the second dielectric layer is patterned such that it delimits the regions where charges are present from the regions where no charges are present, wherein the charge pattern is stable for at least one year.

14. A patterned electret structure on a substrate, wherein the patterned electret structure comprises a dielectric structure, the dielectric structure comprising at least a first non-patterned dielectric layer and a second patterned dielectric layer, and further comprising a charge pattern at an interface between the first non-patterned dielectric layer and the second patterned dielectric layer, and no charges reside both inside the first non-patterned dielectric layer and inside the second patterned dielectric layer, and the charge pattern is such that region(s) with charges are alternated with region(s) without charges and the second patterned dielectric layer is patterned such that it delimits the regions where charges are present from the regions where no charges are present, wherein the charge pattern is stable for at least one year.

* * * * *